US009639611B2

(12) United States Patent
Taichman et al.

(10) Patent No.: US 9,639,611 B2
(45) Date of Patent: *May 2, 2017

(54) SYSTEM AND METHOD FOR PROVIDING SUITABLE WEB ADDRESSES TO A USER DEVICE

(71) Applicant: Doat Media Ltd., Tel Aviv (IL)

(72) Inventors: Amir Taichman, Haifa (IL); Joey Joseph Simhon, Ramat-Gan (IL)

(73) Assignee: Doat Media Ltd., Tel Aviv (IL)

( * ) Notice: Subject to any disclaimer, the term of this patent is extended or adjusted under 35 U.S.C. 154(b) by 165 days.

This patent is subject to a terminal disclaimer.

(21) Appl. No.: 14/468,955

(22) Filed: Aug. 26, 2014

(65) Prior Publication Data
US 2015/0012515 A1  Jan. 8, 2015

Related U.S. Application Data

(63) Continuation-in-part of application No. 13/712,563, filed on Dec. 12, 2012, now Pat. No. 9,141,702, and
(Continued)

(51) Int. Cl.
G06F 17/30 (2006.01)
(52) U.S. Cl.
CPC .. G06F 17/30864 (2013.01); G06F 17/30716 (2013.01); G06F 17/30867 (2013.01); G06F 17/30887 (2013.01)
(58) Field of Classification Search
CPC ......... G06F 17/30867; G06F 17/30864; G06F 17/30887
(Continued)

(56) References Cited

U.S. PATENT DOCUMENTS 5,911,043 A  6/1999  Duffy et al.
6,101,529 A  8/2000  Chrabaszcz
(Continued)

FOREIGN PATENT DOCUMENTS

EP   2288113 A1   2/2011
JP   2009278342   11/2009
(Continued)

OTHER PUBLICATIONS

Currie, Brenton, Apple adds search filters, previous purchases to iPad App Store, Neowin.net, Feb. 5, 2011, http://www.neowin.net/news/apple-adds-search-filters-previous-purchases-to-ipad-app-store.
(Continued)

Primary Examiner — Phong Nguyen
(74) Attorney, Agent, or Firm — M&B IP Analysts, LLC

(57) ABSTRACT

A system and method for providing a suitable web address to a user device. The method comprises: receiving a query from the user device; identifying at least one configuration parameter of the user device; determining a search intent based on the received query; selecting at least one information resource from a plurality of information resources to serve the search intent; identifying a web address respective of each of the at least one selected information resource; and generating a suitable web address based on each identified web address, the search intent, and the at least one configuration parameter, wherein accessing the at least one information resource via the suitable web address allows optimal display of the information provided by the information resource on the user device.

21 Claims, 5 Drawing Sheets

Related U.S. Application Data a continuation-in-part of application No. 13/156,999, filed on Jun. 9, 2011, now Pat. No. 9,323,844, said application No. 13/712,563 is a continuation-in-part of application No. 13/296,619, filed on Nov. 15, 2011, application No. 14/468,955, filed on Aug. 26, 2014, which is a continuation-in-part of application No. 13/156,999, filed on Jun. 9, 2011, now Pat. No. 9,323,844, and a continuation-in-part of application No. 13/296,619, filed on Nov. 15, 2011, and a continuation-in-part of application No. 14/103,536, filed on Dec. 11, 2013, and a continuation-in-part of application No. 13/712,563, filed on Dec. 12, 2012, now Pat. No. 9,141,702.

(60) Provisional application No. 61/870,265, filed on Aug. 27, 2013, provisional application No. 61/653,562, filed on May 31, 2012, provisional application No. 61/354,022, filed on Jun. 11, 2010, provisional application No. 61/468,095, filed on Mar. 28, 2011, provisional application No. 61/822,376, filed on May 12, 2013.

(58) Field of Classification Search
USPC .................................. 707/706, 713
See application file for complete search history.

(56) References Cited

U.S. PATENT DOCUMENTS

| | | |
|---|---|---|
| 6,484,162 B1 | 11/2002 | Edlund et al. |
| 6,564,213 B1 | 5/2003 | Ortega et al. |
| 6,605,121 B1 | 8/2003 | Roderick |
| 7,266,588 B2 | 9/2007 | Oku |
| 7,302,272 B2 | 11/2007 | Ackley |
| 7,376,594 B2 | 5/2008 | Nigrin |
| 7,461,061 B2 | 12/2008 | Aravamudan et al. |
| 7,529,741 B2 | 5/2009 | Aravamudan et al. |
| 7,533,084 B2 | 5/2009 | Holloway et al. |
| 7,565,383 B2 | 7/2009 | Gebhart et al. |
| 7,599,925 B2 | 10/2009 | Larson et al. |
| 7,636,900 B2 | 12/2009 | Xia |
| 7,707,142 B1 | 4/2010 | Ionescu |
| 7,774,003 B1 | 8/2010 | Ortega et al. |
| 7,792,815 B2 | 9/2010 | Aravamudan et al. |
| 7,797,298 B2 | 9/2010 | Sareen et al. |
| 7,958,141 B2 | 6/2011 | Sundaresan et al. |
| 7,966,321 B2* | 6/2011 | Wolosin .............. G06F 17/3087 707/728 |
| 7,974,976 B2 | 7/2011 | Yahia et al. |
| 8,032,666 B2 | 10/2011 | Srinivansan et al. |
| 8,073,860 B2 | 12/2011 | Venkataraman et al. |
| 8,086,604 B2 | 12/2011 | Arrouye et al. |
| 8,271,333 B1 | 9/2012 | Grigsby et al. |
| 8,312,484 B1 | 11/2012 | McCarty et al. |
| 8,571,538 B2 | 10/2013 | Sprigg et al. |
| 8,606,725 B1 | 12/2013 | Agichtein et al. |
| 8,700,804 B1 | 4/2014 | Meyers et al. |
| 8,718,633 B2 | 5/2014 | Sprigg et al. |
| 8,793,265 B2 | 7/2014 | Song et al. |
| 8,799,273 B1 | 8/2014 | Chang et al. |
| 8,825,597 B1 | 9/2014 | Houston et al. |
| 8,843,853 B1 | 9/2014 | Smoak et al. |
| 2004/0186989 A1 | 9/2004 | Clapper |
| 2004/0229601 A1* | 11/2004 | Zabawskyj ......... H04W 76/025 455/417 |
| 2005/0071328 A1* | 3/2005 | Lawrence ......... G06F 17/30867 707/E17.109 |
| 2005/0076367 A1 | 4/2005 | Johnson et al. |
| 2005/0102407 A1 | 5/2005 | Clapper |
| 2005/0108406 A1 | 5/2005 | Lee et al. |
| 2005/0149496 A1 | 7/2005 | Mukherjee et al. |
| 2005/0243019 A1 | 11/2005 | Fuller et al. |
| 2005/0283468 A1 | 12/2005 | Kamvar et al. |
| 2006/0004675 A1 | 1/2006 | Bennett et al. |
| 2006/0031529 A1 | 2/2006 | Keith |
| 2006/0064411 A1 | 3/2006 | Gross et al. |
| 2006/0129931 A1 | 6/2006 | Simons et al. |
| 2006/0136403 A1 | 6/2006 | Koo |
| 2006/0200761 A1 | 9/2006 | Judd et al. |
| 2006/0206803 A1 | 9/2006 | Smith |
| 2006/0224593 A1 | 10/2006 | Benton et al. |
| 2006/0248062 A1 | 11/2006 | Libes et al. |
| 2006/0265394 A1 | 11/2006 | Raman et al. |
| 2006/0277167 A1 | 12/2006 | Gross et al. |
| 2007/0011167 A1 | 1/2007 | Krishnaprasad et al. |
| 2007/0055652 A1 | 3/2007 | Hood et al. |
| 2007/0082707 A1* | 4/2007 | Flynt .............. G06F 3/0481 455/564 |
| 2007/0112739 A1 | 5/2007 | Burns et al. |
| 2007/0174900 A1 | 7/2007 | Marueli et al. |
| 2007/0195105 A1 | 8/2007 | Koberg |
| 2007/0204039 A1 | 8/2007 | Inamdar |
| 2007/0239724 A1 | 10/2007 | Ramer et al. |
| 2007/0255831 A1 | 11/2007 | Hayashi et al. |
| 2007/0300185 A1 | 12/2007 | Macbeth et al. |
| 2008/0065685 A1 | 3/2008 | Frank |
| 2008/0077883 A1 | 3/2008 | Kim et al. |
| 2008/0104195 A1 | 5/2008 | Hawkins et al. |
| 2008/0114759 A1 | 5/2008 | Yahia et al. |
| 2008/0256443 A1 | 10/2008 | Li et al. |
| 2008/0306937 A1 | 12/2008 | Whilte et al. |
| 2009/0049052 A1 | 2/2009 | Sharma et al. |
| 2009/0070318 A1* | 3/2009 | Song .............. G06F 17/30867 707/E17.109 |
| 2009/0077047 A1 | 3/2009 | Cooper et al. |
| 2009/0125482 A1 | 5/2009 | Peregrine et al. |
| 2009/0210403 A1 | 8/2009 | Reinshmidt et al. |
| 2009/0234811 A1 | 9/2009 | Jamil et al. |
| 2009/0234814 A1* | 9/2009 | Boerries ........... G06F 17/30864 707/999.003 |
| 2009/0239587 A1 | 9/2009 | Negron et al. |
| 2009/0240680 A1 | 9/2009 | Tankovich et al. |
| 2009/0265328 A1 | 10/2009 | Parekh et al. |
| 2009/0277322 A1 | 11/2009 | Cai et al. |
| 2009/0327261 A1 | 12/2009 | Hawkins |
| 2010/0030753 A1 | 2/2010 | Nad et al. |
| 2010/0042912 A1 | 2/2010 | Whitaker |
| 2010/0082661 A1 | 4/2010 | Beaudreau |
| 2010/0094854 A1 | 4/2010 | Rouhani-Kalleh |
| 2010/0106706 A1 | 4/2010 | Rorex et al. |
| 2010/0162183 A1 | 6/2010 | Crolley |
| 2010/0184422 A1 | 7/2010 | Ahrens |
| 2010/0228715 A1* | 9/2010 | Lawrence ......... G06F 17/30867 707/706 |
| 2010/0257552 A1 | 10/2010 | Sharan et al. |
| 2010/0268673 A1 | 10/2010 | Quadracci |
| 2011/0047510 A1 | 2/2011 | Yoon |
| 2011/0072492 A1 | 3/2011 | Mohler et al. |
| 2011/0078767 A1 | 3/2011 | Cai et al. |
| 2011/0093488 A1 | 4/2011 | Amacker et al. |
| 2011/0131205 A1 | 6/2011 | Iyer et al. |
| 2011/0225145 A1 | 9/2011 | Greene et al. |
| 2011/0252329 A1* | 10/2011 | Broman ........... G06F 17/30876 715/738 |
| 2011/0264656 A1 | 10/2011 | Dumais et al. |
| 2011/0314419 A1 | 12/2011 | Dunn et al. |
| 2012/0158685 A1 | 6/2012 | White et al. |
| 2012/0198347 A1 | 8/2012 | Hirvonen et al. |
| 2013/0132896 A1 | 5/2013 | Lee et al. |
| 2013/0290319 A1 | 10/2013 | Glover et al. |
| 2014/0025502 A1 | 1/2014 | Ramer et al. |
| 2014/0049651 A1 | 2/2014 | Voth |
| 2014/0279013 A1 | 9/2014 | Chelly et al. |
| 2015/0032714 A1 | 1/2015 | Simhon et al. |

FOREIGN PATENT DOCUMENTS

| | | |
|---|---|---|
| JP | 20090285550 A1 | 11/2009 |
| JP | 2011044147 | 3/2011 |
| KR | 20030069127 | 8/2003 |

(56) References Cited

FOREIGN PATENT DOCUMENTS

| KR | 20070014595 | 2/2007 |
|----|-------------|--------|
| KR | 20110009955 | 1/2011 |
| WO | 2007047464 | 4/2007 |
| WO | 2009117582 | 9/2009 |
| WO | 2010014954 | 2/2010 |
| WO | 2011016665 | 2/2011 |

OTHER PUBLICATIONS

International Search Authority: "Written Opinion of the International Searching Authority" (PCT Rule 43bis.1) including International Search Report for International Patent Application No. PCT/US2012/059548; Date of Mailing Mar. 26, 2013.

International Search Authority: "Written Opinion of the International Searching Authority" (PCT Rule 43bis.1) including International Search Report for corresponding International Patent Application No. PCT/US2012/069250; Date of Mailing: Mar. 29, 2013.

International Searching Authority: International Search Report including "Written Opinion of the International Searching Authority" (PCT Rule 43b1s.1) for the related International Patent Application No. PCT/US2011/039808; Date of Mailing: Feb. 9, 2012.

*Alice Corp* v. *CLS Bank International*, 573 US__, 134 S. CT. 2347 (2014).

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Kurihara, et al., "How to Solve Beginner's Problem, Mac Fan Supports" Mac Fan, Mainichi Communications Cooperation, Dec. 1, 2009, vol. 17, 12th issue, p. 92, Translated.

\* cited by examiner

SYSTEM AND METHOD FOR PROVIDING SUITABLE WEB ADDRESSES TO A USER DEVICE

CROSS-REFERENCE TO RELATED APPLICATIONS

This application claims the benefit of U.S. Provisional Application No. 61/870,265 filed on Aug. 27, 2013, the contents of which are hereby incorporated by reference. This application is a continuation-in-part (CIP) of:

(a) U.S. patent application Ser. No. 13/712,563 filed on Dec. 12, 2012, now pending, which claims the benefit of U.S. Provisional Patent Application No. 61/653,562 filed on May 31, 2012. The application Ser. No. 13/712,563 Application is also a continuation-in-part of the below-referenced U.S. patent application Ser. No. 13/156,999 and the below-referenced U.S. patent application Ser. No. 13/296,619;

(b) U.S. patent application Ser. No. 13/156,999 filed on Jun. 9, 2011, now pending, which claims the benefit of U.S. Provisional Patent Application No. 61/468,095 filed on Mar. 28, 2011, and U.S. Provisional Patent Application No. 61/354,022 filed on Jun. 11, 2010;

(c) U.S. patent application Ser. No. 13/296,619 filed on Nov. 15, 2011, now pending; and (d) U.S. patent application Ser. No. 14/103,536 filed on Dec. 11, 2013, now pending, which claims the benefit of U.S. Provisional Patent Application No. 61/822,376 filed on May 12, 2013. The application Ser. No. 14/103,536 Application is also a continuation-in-part of the above-referenced U.S. patent application Ser. No. 13/712,563.

All of the applications referenced above are herein incorporated by reference

TECHNICAL FIELD

The present invention relates generally to search engines for providing search results respective of user queries and, more specifically, to systems and method for providing suitable web addresses to properly display the accessed content.

BACKGROUND

Web search engines are computer programs accessible to web browsers which are designed to search the world wide web (WWW) and to retrieve web pages, files, and documents that are accessible via the WWW and hosted on websites. Websites commonly have different uniform resource locators (URLs), each of which serves a different type of device. For example, a website often has one URL used for accessing the website via a smart phone and another URL used for accessing the website via a tablet computer. In such cases, each URL allocated to a specific type of device may provide an optimal user interface that is customized to that particular type of device.

When accessing a website via a search engine, a device receives a URL allocated by the search engine respective of a user input. Such allocated URL may not be optimal for the device. As an example, a user accessing a website using a search engine via a mobile device may be allocated a URL to a version of the website that is optimized for personal computers (PCs), but not for mobile devices. As a result, the user's experience on the website accessed via the allocated URL may be sub-optimal. As another example, a piece of content can be viewed on a mobile device through a mobile application (or "app") installed thereon or a web browser. The user experience may be different when viewing the content through these channels. For instance, the user may enjoy reviewing the content from a specific source on its mobile application which is designed to display or otherwise play content from the specific source. However, search engines are designed to return the results in a form of web addresses (or URLs) respective of the mobile device and the search intent of the user.

It would therefore be advantageous to provide a solution for returning a suitable web address to properly access content over the user device.

SUMMARY

A system and method for providing a suitable web address to a user device. The method comprises: receiving a query from the user device; identifying at least one configuration parameter of the user device; determining a search intent based on the received query; selecting at least one information resource from a plurality of information resources to serve the search intent; identifying a web address respective of each of the at least one selected information resource; and generating a suitable web address based on each identified web address, the search intent, and the at least one configuration parameter, wherein accessing the at least one information resource via the suitable web address allows optimal display of the information provided by the information resource on the user device.

The system comprises: an interface to a network for receiving and sending data over the network; a processing unit communicatively connected to the network; and a memory communicatively connected to the processing unit, the memory containing instructions that, when executed by the processing unit, configure the system to: receive a query from the user device; identify at least one configuration parameter of the user device; determine a search intent based on the received query; select at least one information resource from a plurality of information resources to serve the search intent; identify a web address respective of each of the at least one selected information resource; and generate a suitable web address based on each identified web address, the search intent, and the at least one configuration parameter, wherein accessing the at least one information resource via the suitable web address allows optimal display of the information provided by the information resource on the user device

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
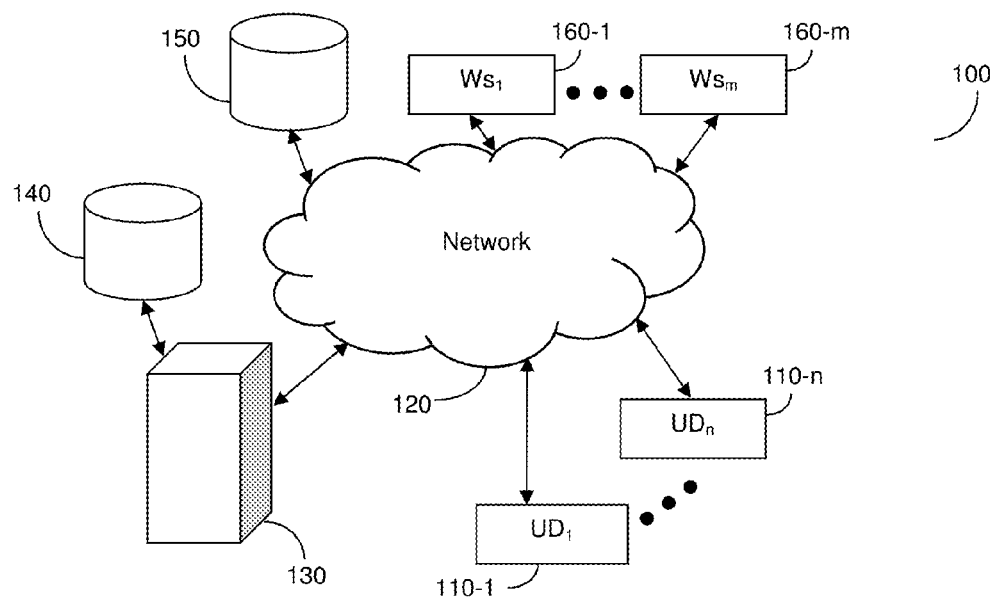
FIG. 1 is a schematic diagram of a system for providing suitable URLS respective of a user input according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a suitable web address to a user device respective of the configuration of the user device and a search intent of the user. In response to an input query, the configuration of the user device and the search intent are determined. A plurality of information resources are searched to find at least one resource that best matches the user query. The web address (hereinafter and without limitation referred to as a "uniform resource locator" or a "URL") is modified to include a specific location within the information source, and the content referenced by the URL will be properly displayed on the user device. The URL modification or transformation is performed based on the determined search intent and the configuration of the device. A user accessing the suitable URL from a device will be directed to a specific content that serves the intent and the content will be provided to the device in a way that is optimized for display in the user device.

FIG. 1 shows an exemplary and non-limiting schematic diagram of a system 100 utilized for describing certain embodiments disclosed herein. A plurality of user devices 110-1 through 110-n (hereinafter referred to collectively as user devices 110 or individually as a user device 110, merely for simplicity purposes) are connected to a network 120. The user device may be, but is not limited to, a smart phone, a mobile phone, a laptop, a tablet computer, a wearable computing device, a personal computer, and so on. The network 120 may be, but is not limited to, a local area network (LAN), a wide area network (WAN), a metro area network (MAN), the world wide web (WWW), the Internet, a wired network, a wireless network, and the like, as well as any combination thereof.

The user devices 110 are configured to submit queries to a server 130 which is also connected to the network 120. The server 130 is configured to send the received queries to and from an intent detection unit (IDU) 140. The IDU 140 is configured to determine the user's search intent (hereinafter "search intent") respective of a query or part of a query received from the user through the user device 110 as further described in co-pending U.S. patent application Ser. No. 14/103,536 filed on Dec. 13, 2013, assigned to common assignee, which is hereby incorporated by reference for all that it contains.

The search intent represents the type of content, the content, and/or actions that may be of interest to the user for a current time period. The IDU 140 is further configured to send the determined search intent to the server 130. The system 100 may further include a database 150 for storing information such as prior search intents, prior queries received from a user, data for enhancing the search experience, applications' classifications, and so on. A plurality of web sources 160-1 through 160-m (hereinafter referred to collectively as web sources 160 or individually as a web source 160, merely for simplicity purposes) are further connected to the network 120. The web sources 160 may include "cloud-based" applications, that is, applications executed by servers in a cloud-computing infrastructure such as, but not limited to, a private-cloud, a public-cloud, or any combination thereof. The cloud-computing infrastructure is typically realized through a data center.

By analyzing the input query and determining the search intent, the server 130 is configured to match one or more appropriate applications respective thereto. An appropriate application may be, but is not limited to, an application which is suited for delivering content respective of the search intent, an application which will perform optimally on the user device providing the query, combinations thereof, and so on. As an example, such applications may be the Wikipedia® website, the IMDB® web application, the ESPN® application in sport related matters, applications that enable local search through the user device 110 contact list, and so on.

Applications are also installed on the user devices 110. The server 130 is configured to crawl through the applications existing in the web sources 160 as well as through the applications installed on the user devices 110. According to certain embodiments, the server 130 is configured to generate metadata respective of the applications. Such metadata may be, but is not limited to, the name of the application, the application bundle name, the application description, the application score, a portion thereof, a combination thereof, and so on. The metadata is then analyzed by the server 130 and the applications are classified to a plurality of functional categories, wherein each category serves a different topic of search intents.

According to another embodiment, one or more additional categories may be generated dynamically respective of search intents as further described herein below with respect to FIGS. 2 and 4. The application's classification is stored in the database 150 for further use. According to one embodiment, upon receiving a query from a user through a user device 110, the IDU 140 is configured to determine the search intent. The server 130 then selects one or more appropriate categories respective of the search intent and provides appropriate resources within the one or more appropriate categories to the user device 110.

In some implementations, some of the disclosed embodiments herein are facilitated by agents installed locally on the user devices 110. Such an agent enables a local crawling search through the content of the user devices 110. The various elements of the system 100 are further described in co-pending U.S. patent application Ser. No. 13/156,999 filed on Jun. 9, 2011, assigned to common assignee, which is hereby incorporated by reference for all that it contains.

Figure 2:
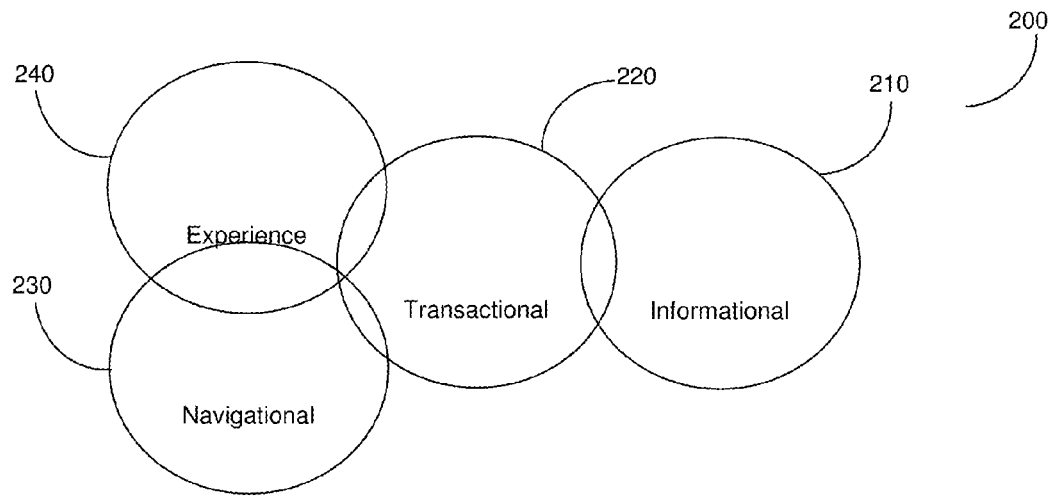
FIG. 2 is a schematic block diagram of exemplary application's categories according to an embodiment.

FIG. 2 depicts an exemplary and non-limiting schematic block diagram 200 of exemplary queries' categories according to an embodiment. In such an embodiment, queries' categories may include an information category 210, a transactional category 220, a navigational category 230, and an experience category 240. The informational category 210 generally includes one or more queries that contain a specific question. As an example, such a query may be "Which team won the NBA championship in 2003?"

The transactional category 220 typically includes one or more queries that require additional actions following the execution of a corresponding one or more applications in order to be appropriately served such as, for example, playing a video within a video streaming website, purchasing tickets through a ticket purchasing applications, and so on. Examples for such transactional applications are the Youtube® application, the Ticketmaster® website, and so on. According to one embodiment, the applications that are determined as appropriate to serve queries that are classified as within the transactional category 220 may be provided with one or more search results respective of the query. As a non-limiting example, if the query received is "watch Madonna's new video clip" and the user device providing such a query is a tablet computer, the stream of the new Madonna's video clip through the Youtube® application for a tablet computer, rather than through the Youtube® main page, will be provided to the user device providing such a query.

The navigational category 230 includes one or more queries that specifically mention the name and/or the functionality required by the user. The one or more queries classified to the navigational category 230 explicitly indicates the search intent. An example for such a query may be "PDF reader", "scanner", and so on. Applications determined as appropriate to serve queries classified to the navigational category may be, for example, photos galleries, alarm clock applications, and so on.

According to another embodiment, an experience category 240 may also be determined based on the search intent. The experience category includes, for example, queries such as "games for five minutes". The search intent based on such a query may be determined to be short and immediate games and, therefore, such games may be provided to a user device providing such a query. A person of ordinary skill in the art would readily appreciate that the queries described in FIG. 2 may be clustered without departing from the scope of the invention and, therefore, several applications may be included in several categories.

Figure 3:
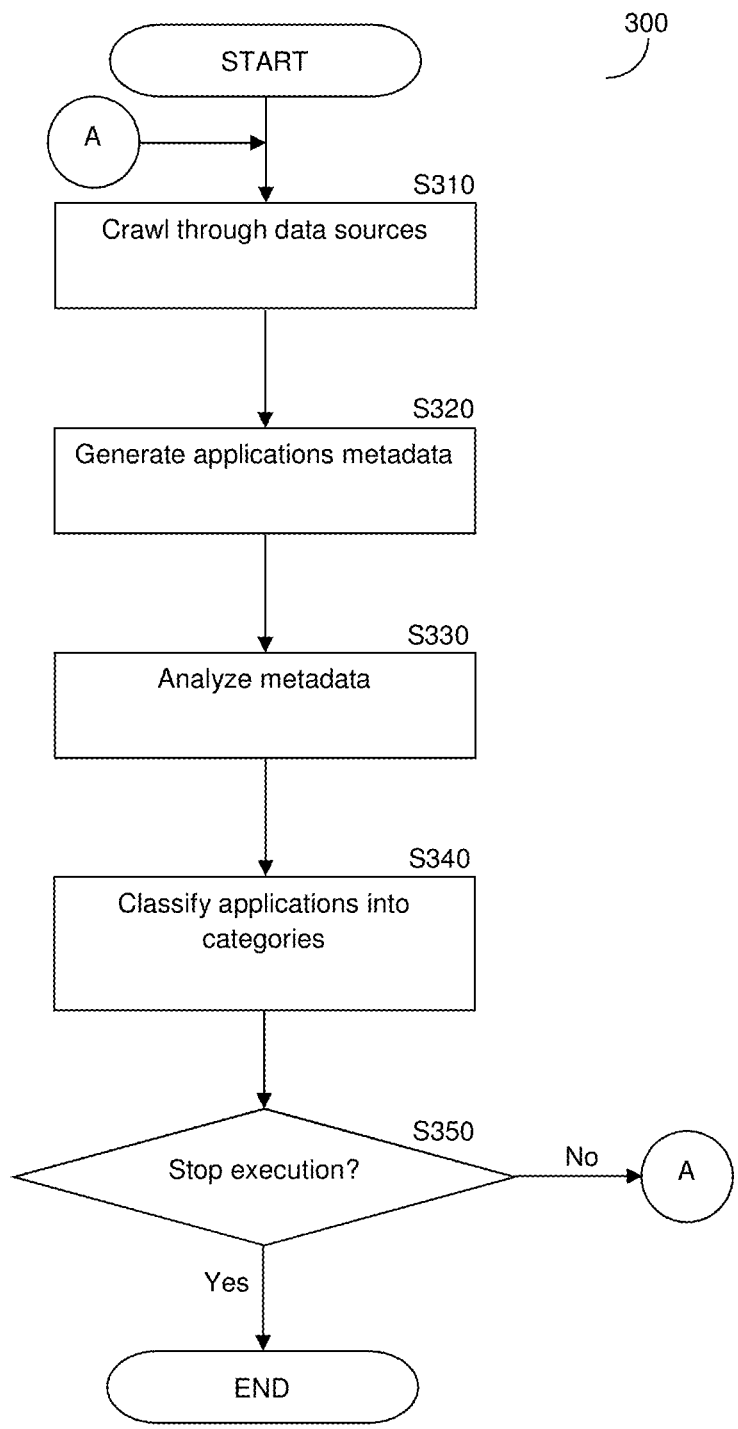
FIG. 3 is a flowchart illustrating indexing applications according to an embodiment.

FIG. 3 depicts an exemplary and non-limiting flowchart 300 illustrating indexing applications into one or more categories according to an embodiment. In an embodiment, the steps of flowchart 300 may be implemented by, but are not limited to, a server (e.g., the server 130). In S310, data resources are crawled through to identify applications. A data resource may be, but is not limited to, a user device (e.g., the user device 110), a database (e.g., the database 150), a web source (e.g., the web source 160), combinations thereof, and so on. In S320, metadata is generated respective of the identified applications. Such metadata may be, for example, the name of the application, the application bundle name, the application description, the application score, and so on.

In S330, the metadata is analyzed. In an embodiment, such analysis may include, but is not limited to, comparing the generated metadata to metadata corresponding to one or more categories of queries (e.g., the categories of queries described herein above with respect to FIG. 2). In a further embodiment, such metadata corresponding to one or more categories of queries may be stored in a database (e.g., the database 150). In S340, based on the analysis of the metadata, the identified applications are determined as appropriate to serve one or more categories of queries as further described hereinabove with respect to FIG. 2. In S350, it is checked whether execution will end and, if so, execution terminates; otherwise, execution continues with S310.

Figure 4:
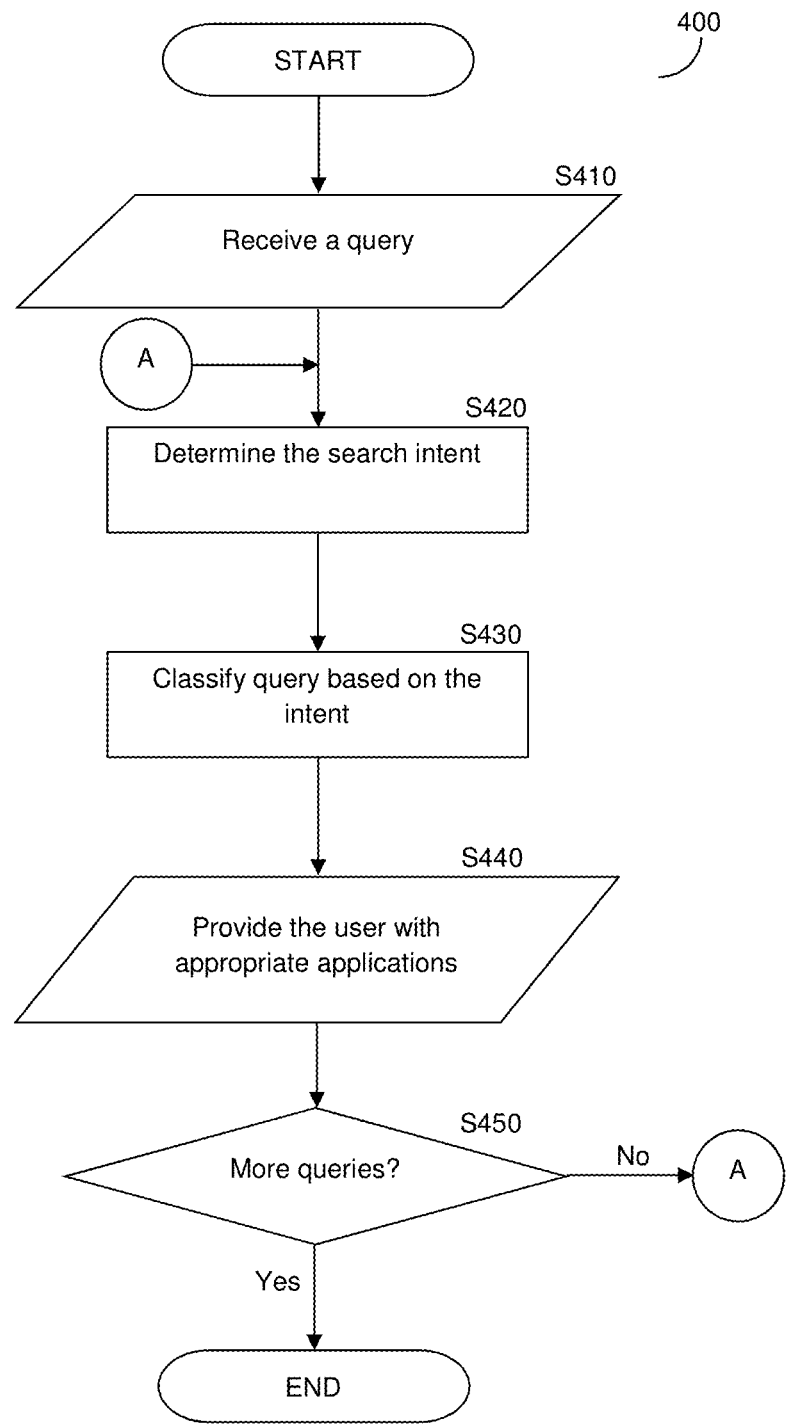
FIG. 4 is a flowchart illustrating providing appropriate applications for queries based on search intent according to an embodiment.

FIG. 4 depicts an exemplary and non-limiting flowchart 400 of a method for providing appropriate applications for queries based on a search intent according to an embodiment. In an embodiment, the steps of flowchart 400 may be performed by, e.g., an IDU (e.g., the IDU 140). In S410, a query, or a portion thereof, is received from a user device such as, for example, the user device 110. In S420, the search intent is determined. Determination of search intent is described further herein below with respect to FIG. 6. In S430, based on the search intent, the query is classified into one or more categories. In S440, one or more appropriate applications are determined as appropriate to serve the one or more categories and are provided to the user via, e.g., the user device 110. In S450, it is checked whether additional queries have been received and, if so, execution continues with S420; otherwise, execution terminates.

A person of ordinary skill in the art would readily appreciate that indexing applications as described in FIG. 3, and providing appropriate applications to queries based on the search intent as described in FIG. 4, may be integrated without departing from the scope of the invention.

Figure 5:
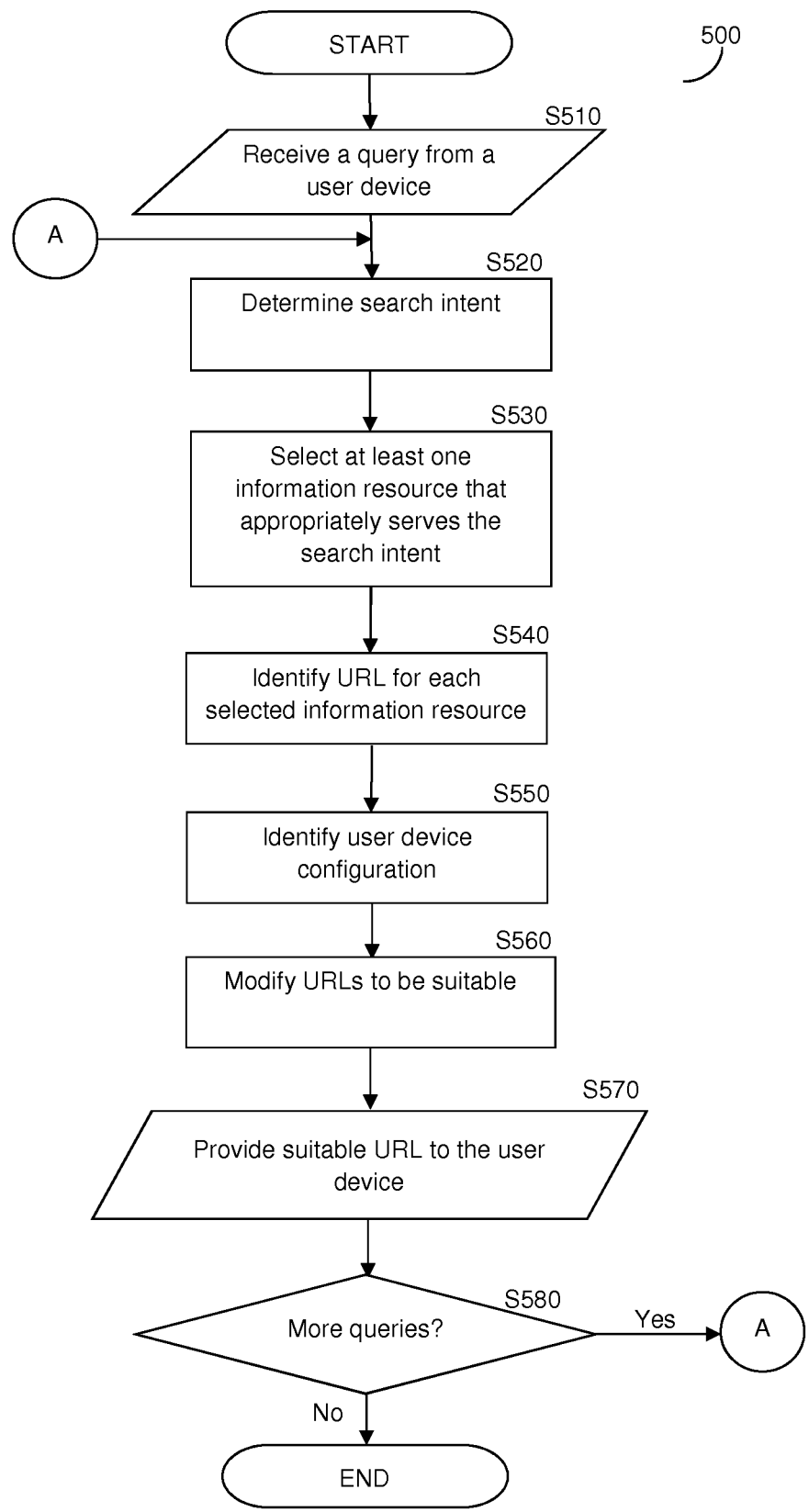
FIG. 5 is a flowchart illustrating providing a suitable URL to a user according to an embodiment.

FIG. 5 depicts an exemplary and non-limiting flowchart 500 of a method for providing suitable URLs according to one embodiment. In an exemplary implementation, the method may be performed by the server 130. In S510, a query, or a portion thereof, is received from a user device such as, for example, the user device 110. The query may be, for example, a keyword, a portion of a keyword, a plurality of keywords, a character, a series of characters, and the like. In one embodiment, auto-completion of at least a portion of a query based on, for example, a user experience, may be provided.

According to another embodiment, the user query may be implicit. In such an embodiment, the search intent may be determined based on one or more variables, such as an environmental variable or a personal variable, as further described in co-pending U.S. patent application Ser. No. 13/712,563 filed on Dec. 12, 2012, assigned to common assignee, which is hereby incorporated by reference for all that it contains. According to yet another embodiment, the query may be a web address requested by the user through the user device.

In S520, the search intent is determined, for example, by the IDU 140, as further described hereinabove with respect to FIG. 6. In S530, based on the search intent, one or more information resources that would appropriately serve the search intent are selected by the server 130. Such information resources may be located in, but are not limited to, one or more user devices (e.g., the user devices 110), a web source (e.g., the web source 160), a database (e.g., the database 150), or a combination thereof. Such information resources may be, but are not limited to, applications (apps) installed in a user device (e.g., the user device 110) and applications executed in remote servers (e.g., web sources 160). In an embodiment, S530 may include searching for information resources using the input query and selecting the most appropriate resources based on the search intent. In S540, a URL of each of the selected information resources is identified.

In S550, based on the input query, the user device configuration is identified. In another embodiment, the identification of the type of the user device may be achieved by, for example, an agent installed on the user device. The user device configuration may include a type of the mobile device, an operation system of the device (e.g., Android, iOS, Windows, etc.), a display size, a display type, rendering capability of the device, a list of applications locally installed on the device, and so on. The type of the device may include a form factor of the device (e.g., a smartphone or a tablet device). In S560, each URL identified in S540 is modified or transformed to be a suitable URL. The suitable URLs are generated based on the determined search intent and the configuration of the device. A user accessing the suitable URL from a device will be directed to a specific content that serves the intent and the content will be provided to the device in a way that is optimized for displayed in the user device. In an exemplary embodiment, the suitable URL is included by modifying the URL of the resource information to include the user query (or a rewritten version of the user query), the search intent, one or more parameters identifying the user device, and or more parameters that can be passed to the application. In an exemplary embodiment, the suitable URL may be in the following format: http://<information resource address>/<input query><intent><device parameters><app parameters>

As a non-limiting example, the user query is "pizza" and, based on the user intent, it is determined that the user is looking for nearby pizza restaurants. Also, the user device configuration indicates that the user device type is an iPhone with an operation system iOS, and a YellowPages application is locally installed. Then, the suitable URL may be generated as follows:
http://m.yelp.com/search?find_desc={pizza}&l=a:{NY}, {NY}, iOS, 65, where "m.yelp.com" is a location of a server for a YellowPages app, "pizza" is the input query, NY, N.Y. is the location representing the intent, iOS is a type of OS of the device, and '65' is the number of results to be returned by application.

As a non-limiting example, the results from the remote servers are returned in a form of "virtual apps." Specifically, the results include applications and web pages that address the user's intent. The "virtual apps" are not downloaded and installed on the device, but rather remotely contain the retrieved information rendered by the APP servers and sent to the Product using the HTML5 communication protocol.

In S570, each suitable URL generated respective of the search is provided to the user device. This would allow the user to view the content addressed by the suitable URL through an application installed, for example, locally on the user device and/or a web browser.

In an embodiment, the suitable URLs allow the display of the results on the user device in a form of "virtual apps." Specifically, such results include content (applications and/or web pages) serving the search intents that are compatible with the user device. The "virtual apps" are not downloaded and installed on the user device, but rather remotely contain the retrieved content as rendered by the web source (e.g., an application server). The retrieved content is accessed through the suitable URL. In an embodiment, the contents are sent to the user device using an HTML5 communication protocol.

In S580, it is checked whether additional queries have been received and, if so, execution continues with S520; otherwise, execution terminates.

As a non-limiting example, the query "watch Madonna like a prayer" is received by a user device (e.g., the user device 110). The search intent to watch Madonna's video clip of the song "Like a Prayer" is determined. A Youtube® web page over which the video clip is shown is identified. The type of the user device is then identified as a smart phone. The suitable URL through which the user device can optimally display the video clip through the Youtube® web page is determined, and the URL is provided to the user device.

Figure 6:
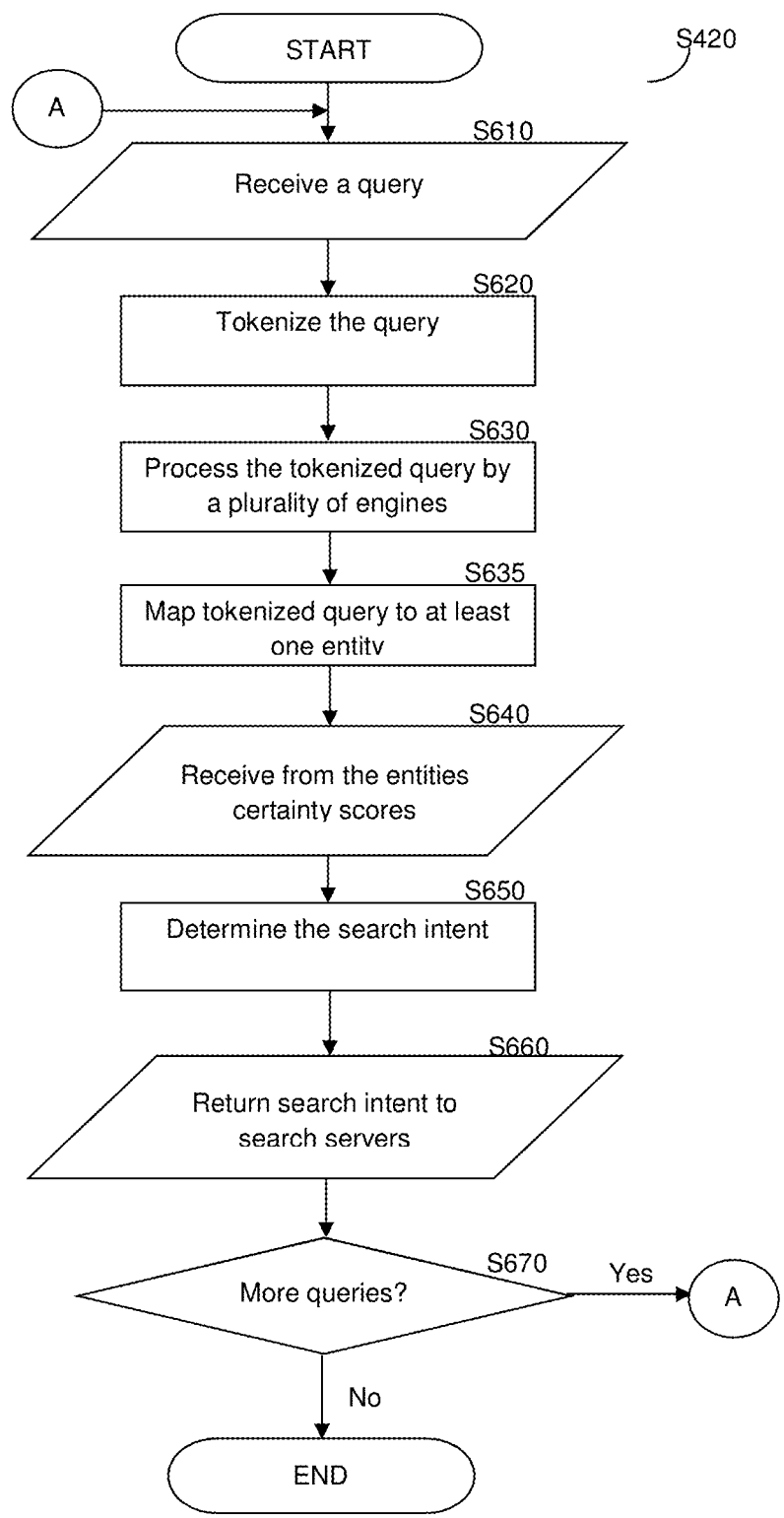
FIG. 6 is a flowchart illustrating a method for determining a search intent according to an embodiment.

FIG. 6 is an exemplary and non-limiting flowchart S420 illustrating determination of a search intent respective of a search query according to an embodiment. In S610, a query or a portion thereof is received. In an embodiment, such a query may be received from a user device (e.g., the user device 110). The input query can be a text query or a voice query, wherein a text query would include a free text query and a structured query. In an embodiment, the user device is a hand held device. In that embodiment, the user tends to type shorter queries, as it is often inconvenient to type long phrases using hand held devices.

In S620, the received query is tokenized into one or more tokenized queries. A tokenized query may be any combination of tokens broken down from the input query. A token may be a word or phrase that appears in an input query. In an embodiment, S620 may be performed by a tokenizer. In S630, the tokenized queries are input to a plurality of engines capable of handling probability calculation. In S635, each engine computes the probability that a tokenized query is mapped to at least one entity that the engine is configured with. An entity represents a topic of interest. The probability computation is realized by a certainty score.

In S640, a certainty score is received from each of the engines of the plurality of engines. As an example, the tokenized query "madonna" can be mapped to the entities "musician" and "religious figure." As noted above, in an embodiment, certainty scores below a predefined threshold are not output by the engines. In S650, at least a statistical analysis, a semantic analysis, or a combination thereof, is performed on at least the certainty scores and entities received from the engines to determine the search intent of the user. In S660, the determined search intent is returned to a search server. In an embodiment, the tokenized queries and the search intent may be saved in a memory. In S670, it is checked whether a new query has been received and, if so, execution continues with S610; otherwise, execution terminates.

Determination of search intents and operation of tokenizers is described further in co-pending U.S. patent application Ser. No. 14/103,536, assigned to common assignee, which is hereby incorporated by reference for all that it contains.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing a suitable web address to a user device, comprising:
   receiving a query from the user device;
   identifying at least one configuration parameter of the user device;
   determining a search intent based on the received query;
   selecting at least one information resource from a plurality of information resources to serve the search intent;
   identifying a web address for each of the at least one selected information resource; and
   modifying at least one identified web address to generate a suitable web address based on the identified web address, the search intent, and the at least one configuration parameter, wherein accessing the at least one information resource via the suitable web address allows optimal display of the information provided by the information resource on the user device.

2. The method of claim 1, wherein the received query is implicit.

3. The method of claim 2, wherein determining the search intent further comprises:
   receiving at least one environmental variable; and
   determining the search intent based, in part, on the at least one environmental variable and the received query.

4. The method of claim 3, further comprising:
   receiving at least one personal variable; and
   determining the search intent based on the at least one personal variable, the at least one environmental variable and the received query.

5. The method of claim 1, wherein determining the search intent further comprises:
   tokenizing the at least one query into one or more tokens;
   providing the one or more tokens to a plurality of engines, wherein each engine of the plurality of engines is configured to handle one or more different topics of interest;
   receiving from the plurality of engines one or more possible search intents and a certainty score for each of the one or more possible search intents respectively generated by the plurality of engines responsive of receipt of the one or more tokens;
   analyzing the certainty score of each of the one or more possible search intents; and
   determining the search intent based on the analysis of the certainty score of each of the one or more possible search intents.

6. The method of claim 1, wherein the received query is any one of: a free text query, a structured query, and a web address.

7. The method of claim 6, wherein the structured query comprises at least a field that contains a term that is provided to a corresponding field of the at least one selected information resource.

8. The method of claim 1, wherein the at least one configuration parameter includes any one of: a type of the user device, an operation system of the user device, a display size, a display type, rendering capabilities of the user device, and a list of applications locally installed on the user device.

9. The method of claim 1, wherein generating the suitable web address further comprises:
   including at least one parameter based on an application that can display the content addressed by the suitable web address.

10. The method of claim 1, wherein the content accessed via the suitable web address is displayed via a virtual application on the user device.

11. A non-transitory computer readable medium having stored thereon instructions for causing one or more processing units to execute the method according to claim 1.

12. A system for providing a suitable web address to a user device, comprising:
    an interface to a network for receiving and sending data over the network;
    a processing unit communicatively connected to the network; and
    a memory communicatively connected to the processing unit, the memory containing instructions that, when executed by the processing unit, configure the system to:
    receive a query from the user device;
    identify at least one configuration parameter of the user device;
    determine a search intent based on the received query;
    select at least one information resource from a plurality of information resources to serve the search intent;
    identify a web address for each of the at least one selected information resource; and
    modify at least one identified web address to generate a suitable web address based on the identified web address, the search intent, and the at least one configuration parameter, wherein accessing the at least one information resource via the suitable web address allows optimal display of the information provided by the information resource on the user device.

13. The system of claim 12, wherein the query is implicit.

14. The system of claim 13, wherein the system is further configured to:
    receive at least one environmental variable; and
    determine the search intent based, in part, on the at least one environmental variable and the received query.

15. The system of claim 14, wherein the system is further configured to:
    receive at least one personal variable; and
    determine the search intent based on the at least one personal variable, the at least one environmental variable and the received query.

16. The system of claim 12, wherein the system is further configured to:
    tokenize the at least one query into one or more tokens;
    provide the one or more tokens to a plurality of engines, wherein each engine of the plurality of engines is configured to handle one or more different topics of interest;
    receive from the plurality of engines one or more possible search intents and a certainty score for each of the one or more possible search intents respectively generated by the plurality of engines responsive of receipt of the one or more tokens;
    analyze the certainty score of each of the one or more possible search intents; and
    determine the search intent based on the analysis of the certainty score of each of the one or more possible search intents.

17. The system of claim 12, wherein the received query is any one of: a free text query, a structured query, and a web address.

18. The system of claim 17, wherein the structured query comprises at least a field that contains a term that is provided to a corresponding field of the at least one selected information resource.

19. The system of claim 18, wherein the at least one configuration parameter includes any one of: a type of the user device, an operation system of the user device, a display size, a display type, rendering capabilities of the user device, and a list of applications locally installed on the user device.

20. The system of claim 19, wherein the system is further configured to:
include at least one parameter based on an application that can display the content addressed by the suitable web address.

21. The system of claim 12, wherein the content accessed via the suitable web address is displayed via a virtual application on the user device.

* * * * *